United States Patent [19]

Elliott, Jr.

[11] Patent Number: 4,591,093
[45] Date of Patent: May 27, 1986

[54] CALIBRATION APPARATUS FOR AIR FLOW CONTROLLERS
[75] Inventor: Alton M. Elliott, Jr., Pearland, Tex.
[73] Assignee: E-Zee Company, Pearland, Tex.
[21] Appl. No.: 751,285
[22] Filed: Jul. 2, 1985
[51] Int. Cl.[4] .............................................. G05D 23/00
[52] U.S. Cl. ...................................... 236/94; 73/1 R; 165/11.1
[58] Field of Search ........................ 236/94; 165/11 R; 73/432 SD, 1 R

[56] References Cited
U.S. PATENT DOCUMENTS 3,890,836  6/1975  McKenzie ........................ 165/11.1 X
4,334,275  6/1982  Levine ............................ 165/11.1 X
4,352,349  10/1982 Yoho ............................... 165/11.1 X Primary Examiner—William E. Tapolcai
Attorney, Agent, or Firm—Arnold, White & Durkee

[57] ABSTRACT

The present invention calibrates air flow controllers by simulating pneumatic signals present in typical heating, ventilating and cooling systems. The controllers receive pneumatic status signals and in response, operate dampers in the air ducts. Each controller must be set to move the damper among positions for air flow rates between calibrated minimum and maximum air flow positions in the duct. The apparatus connects through air piping to the controller to be calibrated. A variable regulator adjusts a supply of constant pressure air to simulate the pneumatic signal from a thermostat while a second variable regulator simulates the differential pressure signal. Gauges register the simulated signals. A third gauge registers the damper control signal generated by the controller. To calibrate a controller, the thermostat and differential air pressure signals are communicated to the controller. The controller dial is then adjusted to provide a pneumatic signal which operates the damper.

16 Claims, 4 Drawing Figures

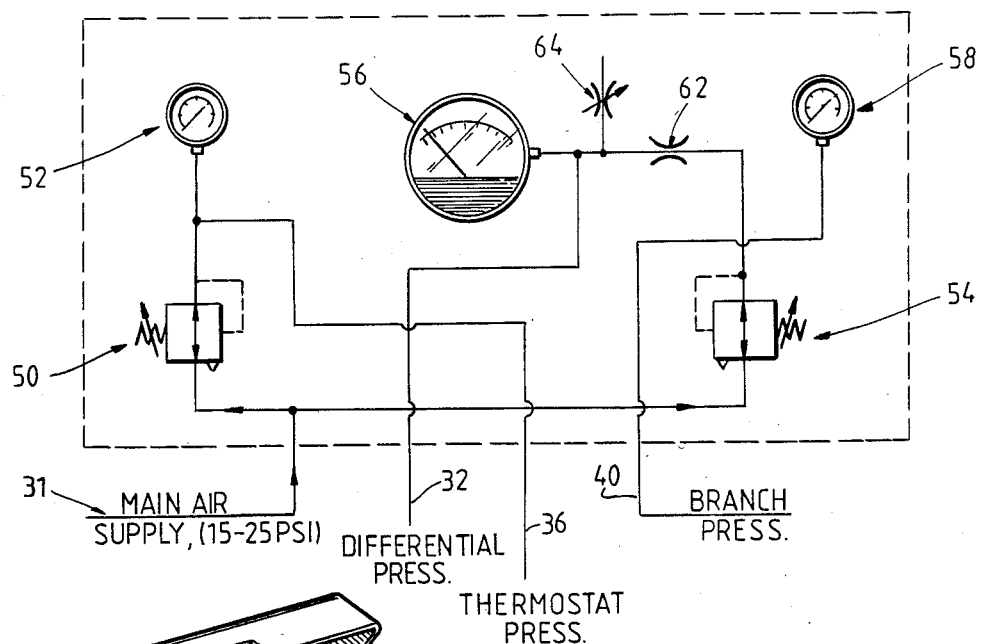
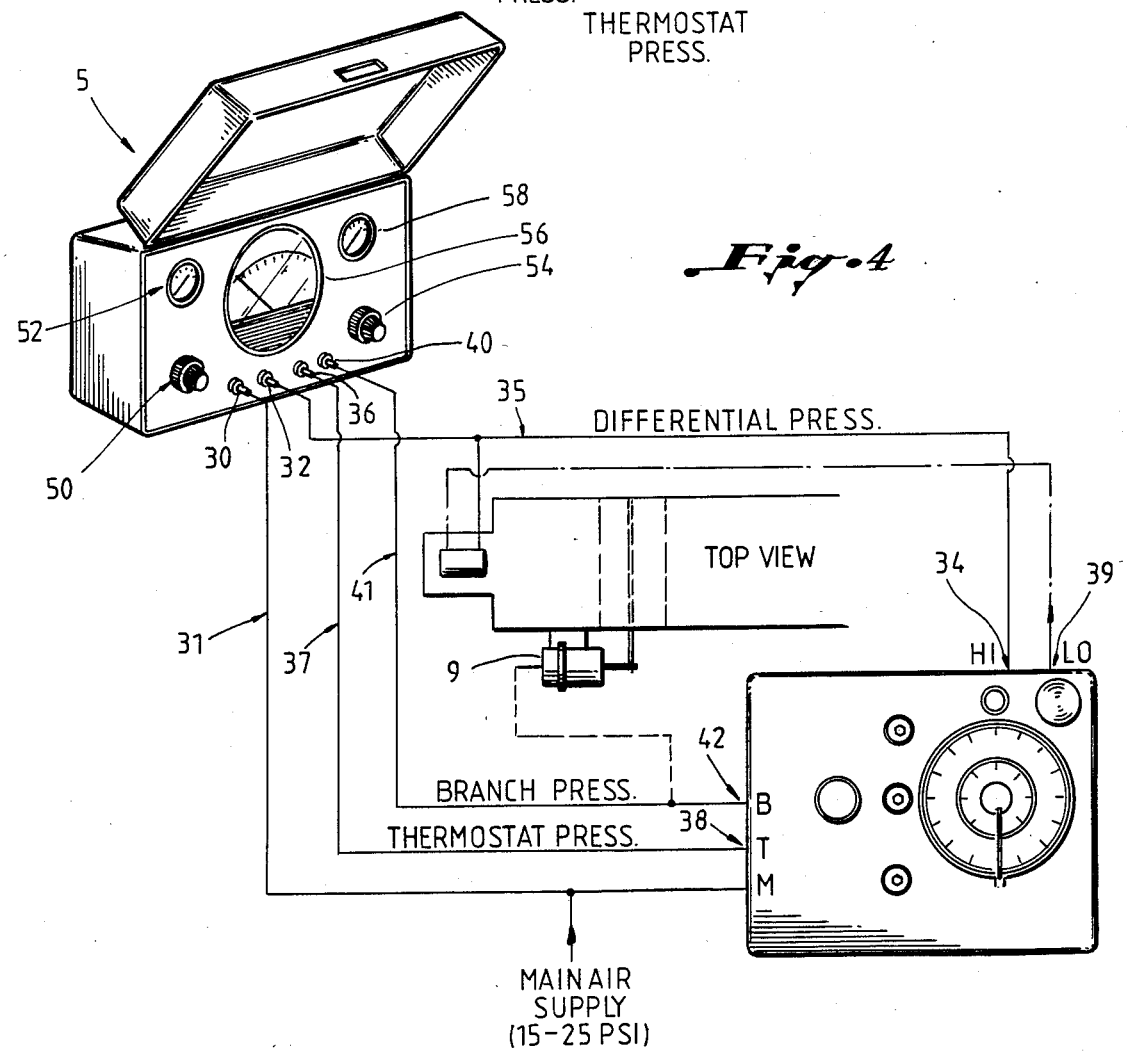

CALIBRATION APPARATUS FOR AIR FLOW CONTROLLERS

BACKGROUND OF THE INVENTION

This invention relates to apparatus for calibrating air flow controllers in heating and air conditioning ventilation systems. More particularly, the invention relates to apparatus which simulates ventilation system pneumatic signals for pre-calibrating or re-calibrating to engineering design specifications an air flow controller in a heating and air conditioning ventilation system.

Among the components of a typical heating, ventilation, and cooling (HVAC) system are ducts, fans, dampers, and thermostats. The fans blow air through the ducts to ventilate rooms of a building. The dampers control the volume of air flowing through individual ducts. A damper is a movable plate contained in a duct. A damper actuator having a piston arm driven by an air cylinder connects to and moves the damper in response to a signal from the controller. A thermostat monitors the air temperature and communicates with a damper controller. The controller responds to the air temperature signal from the thermostat and operates the damper actuator to further open or close the damper.

One known control system for heating, ventilating and cooling is a variable air volume system which uses air pressure signals to control dampers for directing variable volumes of air flow through a duct network to different rooms or zones. A zone is a group of rooms handled by one thermostat. A thermostat in any given room or zone generates an air pressure signal which communicates through a tube or air pipe to a controller. This signal reflects the temperature sensed by the thermostat. The controller responds to the air pressure signal and operates an actuator to open or close the damper in the ventilation duct leading to the room.

A standard supply of air under pressure is input to each thermostat. Typically this main air supply is about 20 pounds per square inch (psi). Typically the output pneumatic signal from a thermostat varies from about 3 psi to about 17 psi. Output signals may be as low as 0 psi or as high as 20 psi. However, signals at these extremes may indicate there is a more serious problem with the air flow system since air control equipment reaches its maximum response before the thermostat signal reaches an extreme level. In typical installations, a duct damper opens for maximum air flow when the thermostat is generating an output signal of about 15 psi. The damper closes to a minimum air flow position when the thermostat signal is about 9 psi. This position is reached when the thermostat reaches its setpoint, i.e., the desired temperature for the room.

Generally, a damper closes no further than a position which allows a minimum air flow through the duct. Also, the damper opens no further than a position which allows a maximum amount of air flow. These minimum and maximum air flow rates are determined when designing the HVAC system. The minimum and maximum positions for the damper are set by calibrating the controller during system installation (or if necessary or desired, recalibrated after the HVAC system is operational.) Thus, a damper in the minimum air flow position restricts most, but not all, of the air flow in a duct. Should more air flow be required in a duct, the damper in the duct opens in response to a signal from the damper controller. The damper takes intermediate positions between the minimum and maximum air flow position, depending on the ventilation requirement of the room to which the air is flowing. As ventilation requirements change, the damper opens and closes in response.

The controller stands between the thermostat and the damper actuator. The controller generates a branch signal based upon the thermostat signal and the differential pressure of air flowing through the duct. The branch signal is the pneumatic signal from the controller to the damper actuator. The differential pressure in ducts is obtained by means of air pressure sensing tubes positioned in the ducts. One tube opens towards the air flow to sense the impact pressure while the other opens the air flow to sense the static pressure. The differential pressure provides an indication of air flow rate in the duct.

The controller translates the thermostat signal and duct differential air pressure into a relative damper movement. After calibration, the controller will not direct the damper to open any further than the maximum air flow position, even if the thermostat signal is requesting additional air flow. This is true for minimum air flow as well.

Pneumatic damper actuators operate using the branch output signal communicated from the controller. The branch signal enters an air cylinder which pushes a piston connected to the damper. The typical operating range for these air cylinders is 8 to 13 psi. Over that range, the damper moves from its minimum position to its maximum position.

A damper actuator unit may also include an auxiliary heating capability which is activated when the thermostat signal is reflecting a temperature relatively lower than the desired temperature. The heating capability is from a warm water coil, electric strip heater, or a warm air duct. The air flow into a room which is cooler than desired may be warmed by passing over the warm water coil, electric strip heater, or by blending warmer air into the air flow.

Shown in Table I is a comparison of the thermostat output pressure to temperature in degrees Fahrenheit for a typical installation. The thermostat output signal changes approximately 2.5 psi per degree change in air temperature. In this example, the mid-range thermostat reading of 72° F. has an output signal of approximately 8.5 psi.

TABLE I

AIR FLOW, THERMOSTAT AND TEMPERATURE COMPARISON

| DESCRIPTION OF AIR FLOW | THERMOSTAT OUTPUT SIGNAL (PSI) | APPROXIMATE TEMPERATURE (Degrees F.) |
|---|---|---|
|  | 17 |  |
|  | 16 |  |
| Maximum | 15 | 75° |
|  | 14 |  |
|  | 13 |  |
|  | 12 |  |
|  | 11 |  |
|  | 10 |  |
|  | 11 |  |
|  | 9 |  |
| Minimum | 8 | 72° |
| No | 8 |  |
| Heat | 7 |  |
| Minimum | 6 | 70° |
| (with auxiliary | 5 |  |
| heating) | 4 |  |
|  | 3 |  |

Signals for temperatures over 75° are effectively requiring additional cooling for the room. Because the damper controller is set to stop opening the damper at a specified flow rate, the room continues to receive the maximum flow rate—the rate it was receiving when the thermostat reached 75°. The same is true for heating. Below 70° F. the room is receiving minimum air flow with auxiliary heating, the same as it received when the thermostat was reading about 71°.

The mid-range temperature is a target or desired room temperature. The temperature reading on the thermostat which corresponds to the mid-range output pressure may be adjusted by the technician. A mid-range of 76° F. would have a range of about 74° to 79° F.

For a typical HVAC system operating in a cooling mode, design engineers determine the maximum and minimum air flow rates to accomplish maximum and minimum cooling. As explained, the maximum flow rate for cooling a room has the damper to the room open as much as necessary to reach the maximum flow rate. The minimum air flow occurs when the room is cool; the damper is then positioned in the duct to restrict as much air flow as necessary. For temperatures between the maximum and minimum temperatures, the damper takes intermediate positions. For a warm room not at the maximum temperature, the damper is positioned at an intermediate position close to the maximum air flow position. As the room cools, the pneumatic thermostat output signal changes. The controller responds and signals the actuator to close the damper and restrict air flow through the duct to the room. Each controller must be set or calibrated individually according to specifications provided by the HVAC engineers.

The present method of calibrating the controllers in an HVAC system is time consuming and subject to error. In general, the range of air flows desired in each duct is determined by reference to engineering blueprints. Then, using standard charts, the differential air pressures corresponding to the specific minimum and maximum flow rates for the controller are ascertained. These charts are semi-log graphs of the pressure drop (or differential pressure in inches of water) plotted against air flow (in cfm) for different size ducts. The ducts are identified by an assembly size number which corresponds to the duct cross-section. The plot results in a series of slanted parallel lines for different duct sizes. The chart is typically found in installation and maintenance manuals published by the HVAC system manufacturer. Also the differential pressure/flow rate chart is frequently affixed to the damper actuator housing or the duct so that the information is readily available to the technician calibrating the controller.

The controllers in HVAC systems normally have dials or equivalent features to adjust the minimum and maximum flow positions of the dampers controlled by the controller. For example, the "TITUS" air flow controller made by the Environmental Elements Corporation has one dial for adjusting the high flow damper position and a separate dial for adjusting the low flow position.

In balancing an HVAC system for cooling using a controller such as the TITUS controller, the individual controllers in the system are set in sequence. The technician sets the thermostat associated with any given controller to be calibrated at its highest temperature. An air pressure gauge such as a MAGNEHELIC gauge manufactured by Dover Instruments Inc. is then connected to the "high end" and "low end" test pressure fittings in the duct controlled by the controller. These fittings connect to the air pressure sensing tubes in the duct to obtain the high impact pressures and low static pressure available with such tubes. The resulting differential air pressure reflects the flow rate in the duct.

With the HVAC system in operation, the minimum air flow dial on the controller is adjusted so that the branch output pneumatic signal from the controller to the damper actuator causes the damper to move toward the minimum air flow position. The technician watches the differential pressure reading on the MAGNEHELIC or equivalent gauge to determine when the damper is positioned for minimum air flow. Since the air system is dynamic, the reading may fluctuate, but the technician attempts to have the desired differential pressure at the middle of the needle fluctuations on the gauge. The technician must wait for the damper actuator to respond to the changed controller setting before evaluating the differential pressure reading on the gauge. Based on this evaluation, further controller setting adjustments may be necessary.

Once the low flow position is set, the technician sets the maximum flow position. Returning to the thermostat, the technician sets the thermostat to its lowest temperature setting. He returns to the controller in the ceiling area and adjusts the maximum air flow dial so that the damper moves towards the maximum air flow position. Again, the system must respond to the changed controller dial before the technician evaluates the differential pressure reading. The technician checks the differential pressure gauge to see if the differential pressure is that which he determined was correct for the maximum air flow. If the differential pressure is not correct, then the controller dial is further adjusted.

This procedure is then repeated several times, since a change in the setting of one of the dials normally impacts the setting on the other dial. However, the adjustment may be in vain, since improper calibration of an upstream controller may result in insufficient air capacity to reach the necessary maximum air flow for the controller being calibrated.

It will be apparent that the above calibration procedure requires careful and patient attention by the technician in implementing the procedure. Any lack of care or patience can readily lead to erroneous settings and controls. Improperly calibrated controllers which permit maximum air flow greater than the design specification results in system operation inefficiencies, insufficient air for downstream controllers and improper cooling and heating of the control rooms. Also, miscalibrated controllers which restrict air flow beyond the minimum specification create problems impacting the performance of other controllers. System operation inefficiencies and improper cooling and heating of the control rooms can also result.

SUMMARY OF THE INVENTION

The present invention makes it possible to simplify the calibration of HVAC systems. Apparatus of the present invention enables controllers to be set before they are made operational in an air flow system. Although some adjustments to individual controllers may be required upon start-up of the system, the magnitude of the adjustments and the time needed to make them will be substantially reduced.

In general, the apparatus of the present invention simulates the pressures and signals which interplay between the HVAC system and its controllers and dampers. In part, the apparatus provides the inputs to the controller which are otherwise provided in a HVAC system from the pneumatic thermostat and the differential pressure tubes. The apparatus thereby makes it possible to pre-set the settings desired on a controller before the system is operated. It also helps in balancing an overall HVAC system by effectively prebalancing the system by presetting the controllers. Since the HVAC is in a steady-state nonoperational mode, the technician does not have to rely on the adjust/wait/evaluate/adjust cycle necessary when calibrating controllers in a dynamic operational system. Moreover, the apparatus is portable and enables the technician to carry the apparatus to the controller. The apparatus will also be advantageously used in recalibrating controllers not providing proper air flow in an operational dynamic HVAC system.

BRIEF DESCRIPTION OF THE DRAWINGS

The invention will further be described by reference to the accompanying drawings which illustrate particular embodiments of the apparatus for calibrating pneumatic air controllers in accordance with the present invention. Like members in the drawings bear like reference numerals.

FIG. 3 is a schematic diagram of the air piping connections for calibration apparatus according to the present invention;

FIG. 4 is an orthographic/schematic view of a calibration apparatus according to the present invention with lines representing the air piping connected to a pneumatic air controller.

DESCRIPTION OF THE PREFERRED EMBODIMENTS

Figures 1, 2:
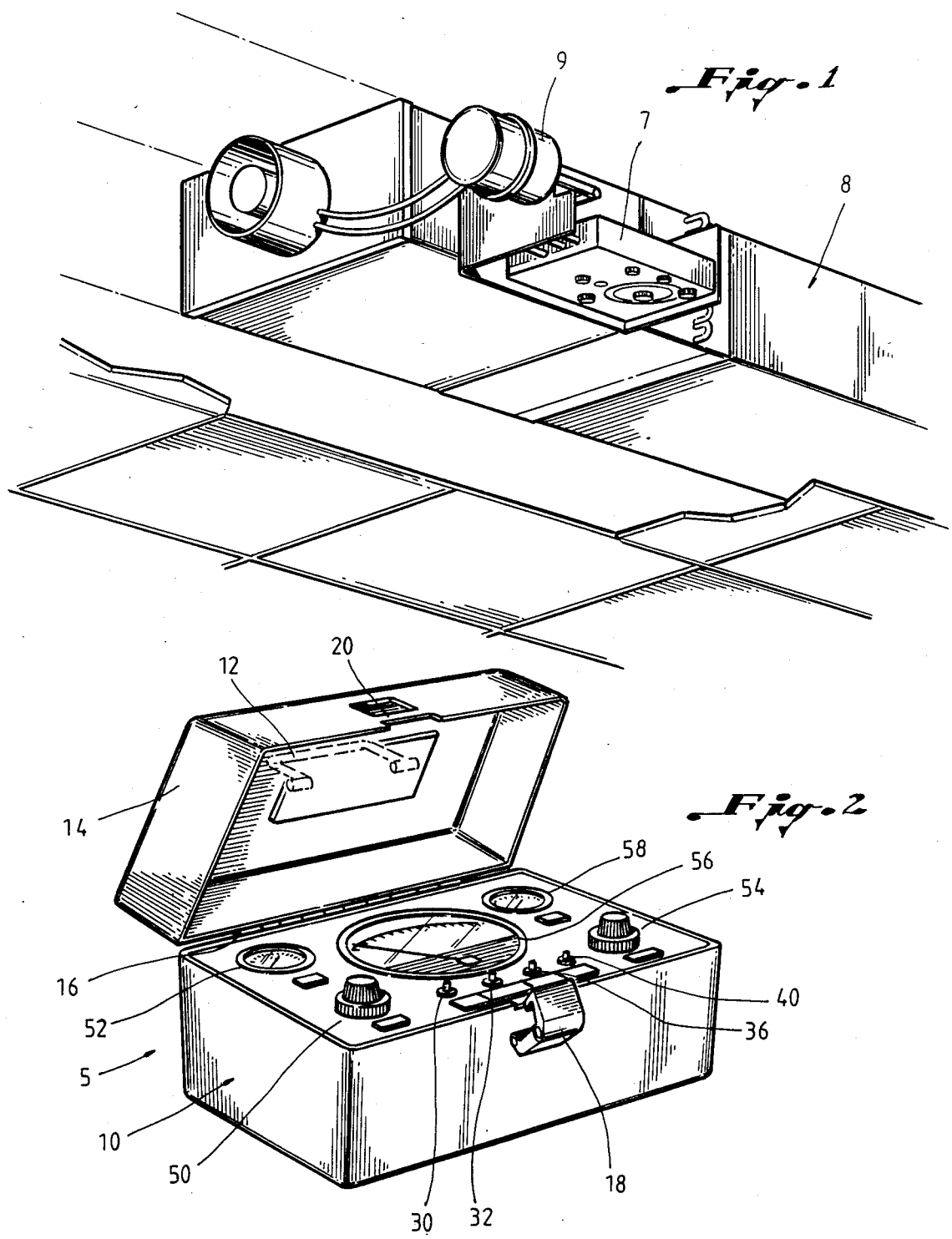
FIG. 1 is an orthographic view of an air duct to which is mounted a damper motor and pneumatic air controller to operate the damper.
FIG. 2 is an orthographic view of apparatus for calibrating pneumatic air controllers in accordance with the present invention.

Referring to the drawings, there is shown in FIG. 2 calibration apparatus 5 according to the present invention. The apparatus 5 connects via air pipes to a pneumatic air flow damper controller 7 (see FIG. 1). The illustrated embodiment is packaged in a portable case for carrying to a job site; however, it will be apparent to those skilled in the art that this embodiment may be readily converted for fixed installation at a test bench or manufacturing facility.

As illustrated in FIG. 1, the controller 7 mounts to the side of an air duct 8. The controller operates the damper actuator 9. Typically, the ducts and controllers are located in ceiling areas hidden by suspended ceiling tiles.

Referring to FIG. 2, the apparatus 5 includes a portable case 10 having a handle 12 for carrying the apparatus. A cover 14 pivots around a hinge 16 allowing the case 10 to be opened for access to the apparatus fittings, controls, and gauges. A latch 18 engages a projection 20 to lock the cover in a closed position.

The apparatus 5 has four air fittings to couple input and output air pipes to the apparatus 5 and the controller 7. A differential air pressure fitting 32, a thermostat pressure fitting 36, and a branch pressure signal fitting 40 are provided to communicate the simulated differential air pressure signals, the thermostat signal and the branch pressure signal present in an HVAC system. A main air fitting 30 connects the apparatus 5 to a source of constant air pressure (see FIGS. 3 and 4). The differential pressure air fitting 32 connects the apparatus 5 to a high pressure port 34 on the controller 7 through a hose 35. The thermostat pressure air fitting 36 connects the apparatus 5 to an input thermostat port 38 on the controller 7 by a hose 37. A controller branch output port 42 communicates by a hose 41 to the branch pressure air fitting 40 on the apparatus 5.

A variable regulator 50 adjusts the pressure of air flowing through the thermostat pressure fitting 36. The main air fitting 30 communicates with regulator 50, providing a source of air pressure for simulating the thermostat output pressure signal. A thermostat pressure gauge 52 is a meter which registers the air pressure signal flowing through the thermoset pressure fitting 36.

A variable regulator 54 adjusts the pressure of air flowing through the differential pressure air fitting 32. The main air fitting 30 also communicates with regulator 54, providing a source of air pressure for simulating the differential pressure signal input to the controller 7. A pressure gauge 56 registers the pressure of air flowing through the differential pressure air fitting 32 to the high pressure port 34 of controller 7.

A branch pressure gauge 58 is a meter which registers the signal pressure of air flowing out of the controller 7 branch output port 42 and into the apparatus 5 through branch pressure fitting 40. The branch pressure signal directs the damper actuator 9 to open and close the damper. Since the apparatus simulates operating signals, the technician calibrating the controller uses the gauge 58 to check that the controller is sending the proper signal.

Gauges are one type of pressure sensors that may be used in apparatus of the present invention. An alterative embodiment employs linear transducers to convert the pneumatic pressure signals into electronic signals. The pressures represented by the electronic signals are displayed on digital outputs rather than on gauges.

The air piping connections within the apparatus of the present invention may be better understood upon reference to FIG. 3. The main air supply hose 31 communicates air under pressure to the thermostat pressure variable regulator 50 and the differential pressure variable regulator 54. Thermostat pressure gauge 52 registers the pressure of the air flowing through the thermostat pressure fitting 36 as an input signal to the controller 7.

The differential pressure variable regulator 54 controls the air pressure flowing through the differential pressure air fitting 32 to the high pressure port 34 of the controller. The pressure gauge 56 registers the pressure of the air signal simulating the differential pressure input to the controller 7. In the illustrated embodiment, the gauge 56 is a MAGNEHELIC gauge calibrated in inches of water with a maximum reading of 1 inch. A restrictor 62 limits the air under pressure passing to the gauge 56 and the differential pressure fitting 34. An adjustable valve 64 in communication with restrictor 62 dumps the excess air from the gauge. The adjustable valve 64 is set so that when regulator 54 is completely open, the gauge 56 registers its maximum value. If gauge 56 is replaced with another meter or gauge, suitable adjustments should be made with valve 64 so the replacement gauge is not subject to air pressure which exceeds its operating range.

Referring to FIG. 3, the branch pressure output signal from the controller 7 is input to the apparatus through branch pressure fitting 40. The branch pressure gauge 58 communicates with the branch pressure fitting and registers the branch output pressure from the controller 7. The damper actuator 9 uses the branch pressure signal to position the damper in the duct for the appropriate volume of air required to flow in the duct to the room.

FIG. 4 illustrates the air piping connecting the calibration apparatus of the present invention to a typical penumatic controller. In operation, the calibration apparatus enables a field service technician to simulate pneumatic signals for operating the air flow controller 7. The apparatus is packaged in a small portable container 10, so that the service technician can climb on a ladder to the ceiling areas where air flow controllers are typically located, and carry the calibration apparatus with him.

When using the present apparatus, all existing pneumatic lines to the controller 7 are disconnected, with the exception of the main air line. (In typical HVAC systems using pneumatic controllers, a main air line having air at a constant pressure is available. The controller 7, as well as the apparatus 5, use the main air supply.) The main air pipe 31 communicating constant air pressure is connected to the main air fitting 30. One end of the air pipe 37 is connected to the thermostat pressure fitting 36, and the other end is connected to the thermostat input port 38 of the controller 7. The third air pipe 35 is attached between the differential pressure fitting 32 and the high static pressure port 34 of the controller 7. The low static pressure port 39 of the controller remains open to the atmosphere. Since the controller is analyzing differential pressure, leaving the low pressure port open to the atmosphere is the same as setting the low port signal to zero. The fourth air pipe 41 communicates a signal between the branch output port 42 of the controller 7 and the branch input fitting 40.

After making the air pipe connections between the apparatus 5 and the controller 7, the technician determines the differential pressures for the minimum and maximum air flow for that damper. As explained earlier, maximum and minimum air flow rate specifications are typically recorded on blueprints or other instructions for use in balancing HVAC air flow systems. By referring to a standard air flow/differential pressure chart for the equipment to be calibrated, the technician selects the equivalent differential pressures for the minimum and maximum flow rates desired for a particular duct. These are a function of the flow rate and the particular duct size.

To calibrate the controller setting for the minimum air flow, the thermostat signal pressure variable regulator 50 is turned off. The differential pressure variable regulator 54 is adjusted to provide a reading on the gauge 56 equal to the differential pressure value obtained from the chart for the minimum flow rate. The low flow setting dial or other mechanism on the controller is adjusted to provide a predetermined air pressure signal from the branch pressure outlet port 42 of the controller. That pressure is a value above the minimum pressure necessary to begin moving the damper. The typical actuator operating range is between 8 and 13 psi. The predetermined air pressure of a typical actuator for minimum air flow is about 8 psi. The technician, however, sets the controller dial so the branch signal is some value above the minimum and below the mid-point of the actuator operating range, since the dampers fluctuate their positions when the system is operational. This provides some margin of error for the controller in attempting to position the damper so that the desired minimum air flow velocity (as indicated by the differential pressure) is directed to the room handled by that controller.

The branch pressure gauge 58 on the apparatus 5 registers the output pressure. The technician monitors the guage 58 while adjusting the controller dial. The controller only has to pressurize the air pipe 41 and the gauge 58. Thus, the time required to adjust and evaluate is significantly shortened over the time required for the previous calibrating methods. Previous methods with the HVAC system in operation require the damper to move and thus change the differential pressure in the duct. It takes a significant amount of time for the air flow in the duct to stabilize so that a proper evaluation can be made.

The branch output pressure signal for maximum air flow is then set. First the thermostat pressure variable regulator 50 is adjusted to provide the thermostat input port 38 of the controller 5 with the thermostat pressure for maximum air flow or approximately 15 psi. The differential pressure controller 54 is adjusted, until gauge 56 displays the differential pressure for maximum air flow as obtained from the chart. The high flow setting dial or similar device of the controller is then adjusted to provide a predetermined output pressure which is displayed on gauge 58. This pressure signal is some value less than the maximum pressure to operate the damper. As with setting the minimum air flow position to provide a margin of error and allow for the narrow operating range of the damper actuator, the technician typically sets the controller so the branch signal for maximum air flow is above the mid-point and below the maximum value of the actuator operating range.

The branch pressure gauge 58 on the apparatus 5 registers the output pressure. The technician monitors the guage 58 while adjusting the controller dial.

This procedure is repeated several times, since a change in one air flow setting impacts the other air flow setting. The controller is now calibrated to provide minimum and maximum air flow through the duct. The branch pressure hose is disconnected from the branch air fitting 40 and reconnected to the damper actuator air fitting 60. The thermostat pressure air pipe 37 is disconnected from the thermostat port 38 on the controller. The differential pressure air pipe 35 is disconnected from the controller also. The controller air pipes are then reconnected. The differential pressure hoses from the duct are reconnected to their respective high pressure and low static pressure fittings on the controller. The signal pipe from the room thermostat is reconnected to the thermostat input signal fitting on the controller.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is:

1. Apparatus for calibrating a pneumatically controlled HVAC system of ducts, wherein a pneumatic controller having multiple air fittings receives air through a first said fitting from a source of high pressure air and separately receives a first pneumatic signal through a second said fitting from a thermostat and a second pneumatic signal through a third said fitting reflecting the rate of air flow in a duct in said system to generate a third pneumatic signal operable through a fourth said fitting to actuate a damper positioner for a damper in said duct, which comprises in combination:

separate first and second air pressure regulators adapted to receive air from said source of high pressure air;

said first regulator connectable to said second fitting to supply a simulated said first pneumatic signal to said controller in place of said first pneumatic signal from said thermostat;

said second regulator connectable to said third fitting to supply a simulated said second pneumatic signal to said controller in place of said second pneumatic signal; and a first pressure sensor adapted to indicate the magnitude of said third pneumatic signal generated by said controller in response to said simulated first and second pneumatic signals.

2. Apparatus as recited in claim 1, further comprising:
a second pressure sensor adapted to indicate the magnitude of said simulated first pneumatic signal; and
a third pressure sensor adapted to indicate the magnitude of said simulated second pneumatic signal.

3. Apparatus as recited in claim 2, further comprising:
a flow restrictor in communication intermediate said second regulator and said third pressure sensor, said flow restrictor sized to limit the maximum pneumatic signal communicated to said third pressure sensor.

4. Apparatus as recited in claim 3, further comprising:
a bleed valve in communication with said flow restrictor to permit excess pneumatic pressure to escape.

5. Apparatus as recited in claim 4, further comprising a container adapted to hold said regulators, said pressure sensors, said restrictor, and said valve.

6. Apparatus as recited in claim 1, wherein said pneumatic controller receive said second pneumatic signal as an air flow impact pressure signal through said third said fitting and an air flow static pressure signal through a fifth said fitting.

7. Apparatus for calibrating a pneumatically controlled HVAC system of ducts, thermostats and dampers comprising:
a first input fitting attachable to a first source of air;
a first output fitting;
a first air pressure regulator interconnecting said first air input fitting and said first output fitting arranged and of a character to deliver air at a regulated pressure to said first output fitting;
a second output fitting;
a second air pressure regulator interconnecting said first air input fitting and said second output fitting arranged and of a character to deliver air at a regulated pressure to said second output fitting;
a second input fitting attachable to a second source of air; and
a first pressure sensor adapted and of a character to indicate the pressure at said second input fitting.

8. Apparatus as recited in claim 7, further comprising:
a second pressure sensor adapted and of a character to indicate the pressure at said first output fitting; and
a third pressure sensor adapted and of a character to indicate the pressure at said second output fitting.

9. Apparatus as recited in claim 8, further comprising:
a flow restrictor in communication intermediate said second air pressure regulator and said second pressure sensor, said flow restrictor sized to limit the maximum pneumatic signal communicated to said third pressure sensor.

10. Apparatus as recited in claim 9, further comprising:
a bleed valve in communication with said flow restrictor to permit excess pneumatic pressure to escape.

11. Apparatus for calibrating a pneumatic air control device in a pneumatically controlled HVAC system of ducts, fans, thermostats, and dampers, comprising:
a first pneumatic input signal fitting adapted to receive a constant pressure pneumatic input signal;
a first variable regulator in communication with said first pneumatic input signal fitting for generating a first pneumatic output signal;
a first gauge to register said first pneumatic output signal;
a second variable regulator in communication with said first pneumatic input signal fitting for generating a second pneumatic output signal;
a second gauge to register said second pneumatic output signal;
a second pneumatic input signal fitting adapted to receive a second pneumatic input signal generated by said control device in response to said first and second output signals; and
a third gauge in communication with said second input signal fitting to register said second input signal.

12. Apparatus as recited in claim 11, further comprising:
a flow restrictor in communication intermediate said second variable regulator and said second gauge, said flow restrictor sized to limit the maximum pneumatic signal communicated to said second gauge.

13. Apparatus as recited in claim 12, further comprising:
a bleed valve in communication with said flow restrictor to permit excess pneumatic pressure to escape.

14. Apparatus as recited in claim 11, further comprising:
a container adapted to hold said fittings and said gauges;
a cover attached by a hinge to said container;
a latch to secure said cover to said container; and
a handle connected to a top surface of said cover.

15. A method of calibrating a pneumatically controlled HVAC system of ducts, thermostats and dampers, wherein a pneumatic controller which is operable in response to a first pneumatic signal from a thermostat in the system and to a second pneumatic signal from an air flow rate sensor in one of said ducts to transmit air from a source of relatively high pressure air to a damper actuator for a damper in said system, which comprises:
transmitting air at a first predetermined pressure from said air source to said controller in place of said first pneumatic signal;

transmitting air at a second preselected pressure from said air source to said controller in place of said second pneumatic signal; and detecting the pressure of air to be transmitted from said controller to said daper actuator in response to said first and second preselected signals.

16. A method of calibrating a pneumatically controlled HVAC system of ducts, thermostats and dampers, as recited in claim 15, further comprising:

comparing the detected pressure to a predetermined pressure; and adjusting and controller to transmit said predetermined pressure of air from said controller to said damper actuator in response to said first and second preselected signals.

* * * * *

UNITED STATES PATENT AND TRADEMARK OFFICE
CERTIFICATE OF CORRECTION

PATENT NO. : 4,591,093
DATED : May 27, 1986
INVENTOR(S) : Alton M. Elliott, Jr.

It is certified that error appears in the above-identified patent and that said Letters Patent are hereby corrected as shown below:

Column 10, line 8, delete "second" (second occurrence) and
     insert therefor --third--.

Column 11, line 5, delete "daper" and insert therefor
     --damper--.

Signed and Sealed this

Twentieth Day of October, 1987

Attest:

DONALD J. QUIGG

Attesting Officer

Commissioner of Patents and Trademarks